Oct. 3, 1933.     A. HALL     1,929,169
BRAKE LOCK
Filed Sept. 21, 1931     5 Sheets-Sheet 1

INVENTOR.
ALBERT HALL
BY
A. D. Caesar
ATTORNEY.

Feb. 12, 1929.
M. J. NORMAN, SR
1,702,169
CHOCK BEAM
Filed July 20, 1927
2 Sheets-Sheet 2
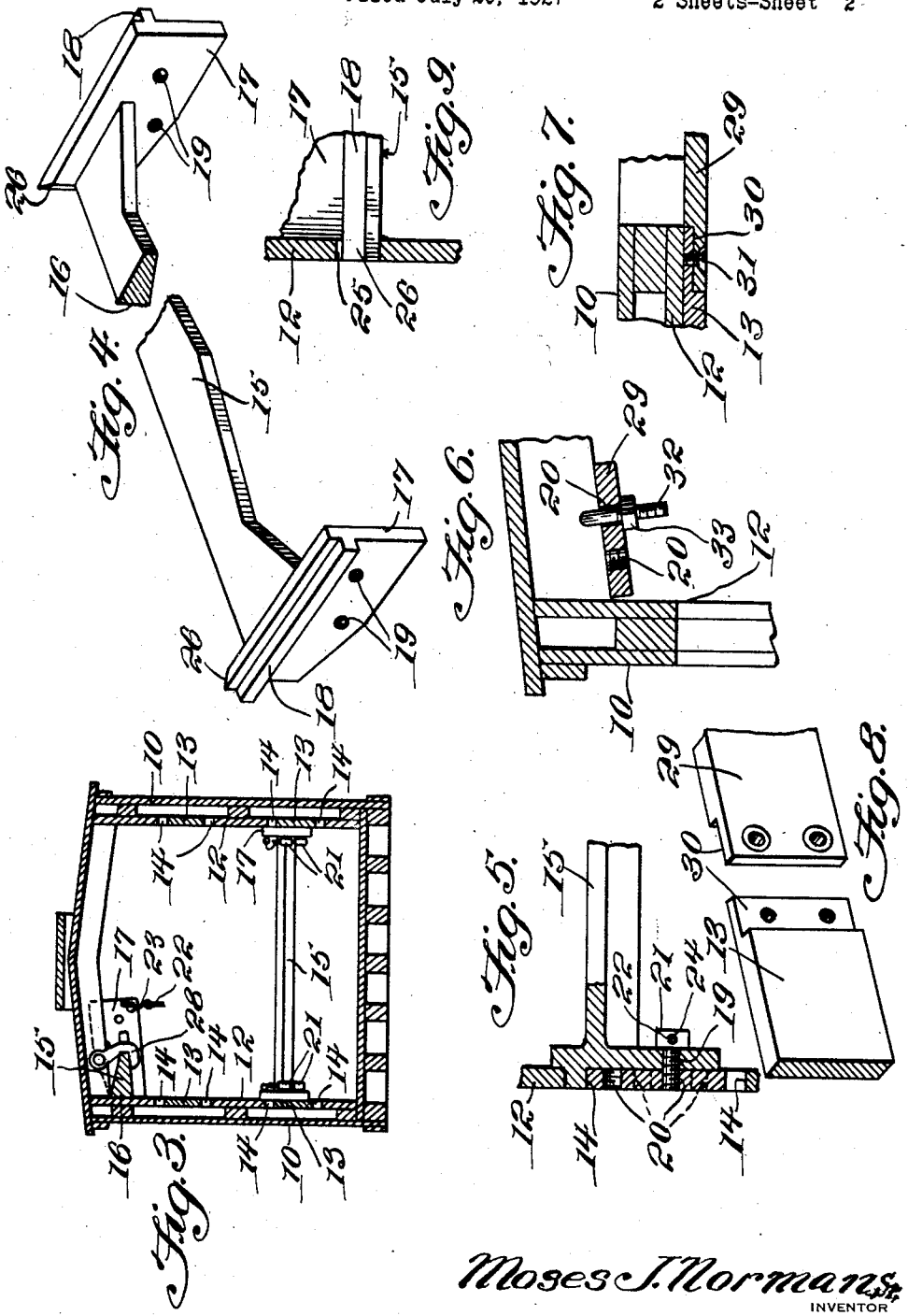
Moses J. Norman Sr.
INVENTOR
BY Victor J. Evans
ATTORNEY
WITNESS: J. T. L. Wright Oct. 3, 1933.                A. HALL                1,929,169
                            BRAKE LOCK
           Filed Sept. 21, 1931          5 Sheets-Sheet 3

INVENTOR.
ALBERT HALL
BY
   ADCaesar
      ATTORNEY.

Oct. 3, 1933.  A. HALL  1,929,169
BRAKE LOCK
Filed Sept. 21, 1931   5 Sheets-Sheet 4
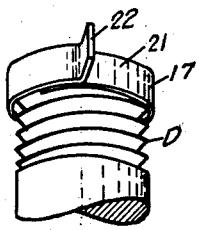
FIG. 16
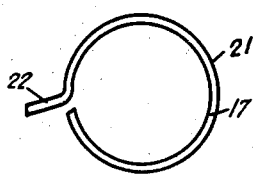
FIG. 17
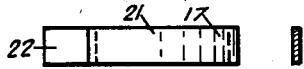 
FIG. 18   FIG. 19
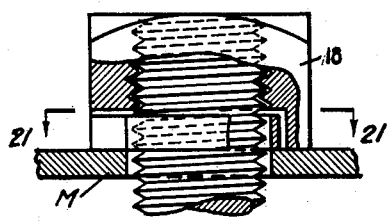
FIG. 20
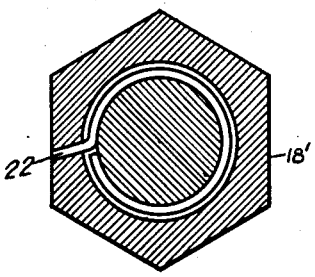
FIG. 21
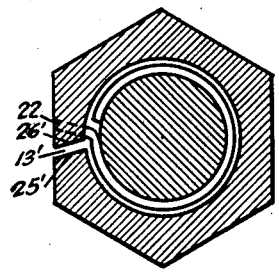
FIG. 22
FIG. 23
INVENTOR.
ALBERT HALL
BY
*A D Caesar*
ATTORNEY.

Patented Oct. 3, 1933

1,929,169

UNITED STATES PATENT OFFICE 1,929,169

BRAKE LOCK

Albert Hall, Wynnewood, Pa.

Application September 21, 1931
Serial No. 564,046

14 Claims. (Cl. 151—14)

The subject matter of this application has been carved out of a parent application Serial Number 504,446, filed December 24, 1930.

This invention relates to locking mechanisms for elements which are threadably joined together and has for its object the production of a new and improved lock for this purpose.

It has been proposed in the prior art to lock and prevent the loosening of two elements which are threadably joined together by inserting between them a coil having a plurality of turns and terminating at one end in a locking lug. The objections to this type of means resides in the fact that the coil will not function in the proper manner unless it is so placed on the male member of the two elements which are being joined together that the direction of the coil, when looking down upon the said male member and taking the anchoring lug as the starting point, is clockwise.

It is one of the objects of this invention to provide a lock of this type wherein it will be impossible for the user to insert the coil in any but the proper manner.

I accomplish the above purpose by so forming the slot which receives the anchoring lug that the said lug cannot be inserted therein unless the coil is in the proper operative position.

Another object of this invention is to provide a lock of this type which will exert a greater braking pressure than that present in any prior art structure.

Another object of this invention is to produce a lock for elements which are threadably joined together which will tighten when subjected to forces producing vibration.

The above as well as other objects of this invention and the advantages arising therefrom will be obvious from the following description and drawings which form a part thereof.

In the drawings, Figure 1 is a perspective view of a brake band which constitutes one of the elements of my invention.

Figure 2 is a perspective view showing the brake-band mounted upon a bolt and the specially slotted nut, which constitutes another of the elements of my invention, immediately above said bolt in position for being threadably mounted on the same.

In Figure 2 and in all subsequent figures where the bolt appears the lower portion of the bolt is shown as broken away since the same is not necessary for the purpose of illustrating this invention.

Figure 9 is a perspective view generally similar to Figure 2 as to the relative positions of the bolt, brake-band and nut but showing a square nut having a slot at a different position than that shown in Figure 2. The slot is also narrower than that shown in Figure 2.

Figure 10 is a view showing the assembly of a hexagon nut and brake-band in operative position upon a bolt wherein the nut has a slot at the angle and of the size shown in Figure 9. A portion of the nut has been broken away for the purpose of clearness.

Figure 11 is a section taken on the line 11—11 of Figure 10.

Figure 12 is a section taken similarly to Figure 11 wherein the brake-band has been reversed, that is rotated through 180° and illustrates the non-reversible or fool-proof feature of my invention.

Figure 14:
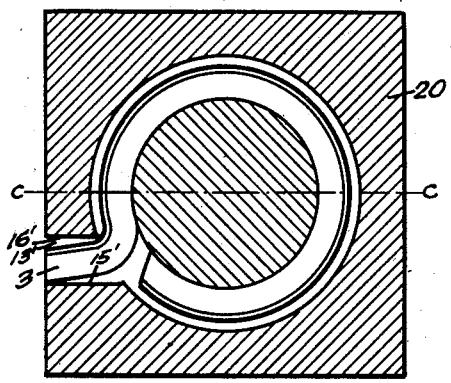
Figure 14 is a section taken along the line 14—14 of Figure 13.
Figure 15:
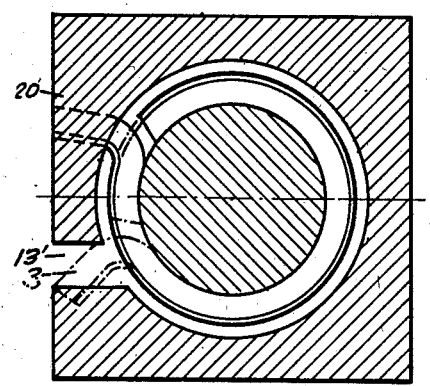

Figure 15 is a view taken similarly to Figure 14 wherein the brake-band has band reversed, that is, rotated through 180°. The full and dotted lines show the position of the brake-band when reversed, while the dot and dash lines show the position which the lug of the brake-band assumes relatively to the slot in the nut when the brake-band in its reversed position is rotated to the position wherein its lug lies under the nut slot.

Figure 16 is a perspective view showing a modified form of brake-band mounted upon a bolt.

Figure 17 is a top view of the band shown in Figure 16.

Figure 18 is a front view of the band shown in Figure 16.

Figure 19 is a section on the line 19—19 of Figure 18.

Figure 20 is a front view of the assembly of a nut and a brake-band of the type shown in Figure 17 in operative position upon a bolt.

Figure 21 is a section along the line 21—21 of Figure 20.

Figure 22 is a section taken similarly to Figure 21 wherein the brake-band has been reversed, that is, rotated through 180° and illustrates the foolproof feature of my invention.

Figure 23 is a front view of a still further modified form of brake-band. Portions of the band are broken away for the purpose of clearness.

Figure 3:
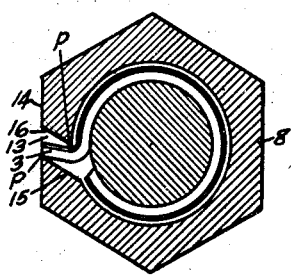
Figure 3 is a section taken along the line 3—3 of Figure 4.

Figure 24 is a section taken similarly to Figure 3 showing, among other things, a hexagon nut having a plurality of slots formed therein and will here be used for the purpose of illustrating the basic principles underlying my invention.

Figure 25:
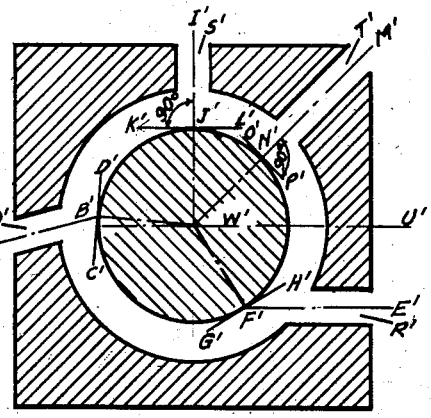

Figure 25 is a view taken similarly to Figure 24 showing a square nut having a plurality of slots formed therein and will here be used for the same purpose as Figure 24.

Figures 26, 27, 28 and 29 are force diagrams showing stresses set up in brake-bands wherein the slot is shown in different positions and illustrating another of the principles which I have discovered and incorporated in my device. The sections shown in Figures 26 to 29 inclusive are all taken similarly to Figure 3.

It is to be noted that in the illustrations herein my invention has been incorporated into a nut and a bolt structure but it should be understood that any other elements which are threadably joined together may be substituted for the nut and bolt here shown.

It is to be understood that in the disclosure herein the bolt B is generically representative of the male member of two elements which are threadably joined together while the nuts are generically representative of the female member of two such elements.

Referring more particularly to the drawings wherein similar reference numerals denote similar parts, reference numeral 1 designates a helical braking coil (see Figure 1) having a body portion 2 terminating in a locking lug 3. The coil is adapted to be mounted upon and cooperate with the threads 5 formed upon the bolt B (see Figure 2). The diameter of the body portion 2 of the lug 1 is preferably somewhat less than the small diameter $d$ of the threads 5 whereby a certain amount of initial tension is always present when the roll 1 is mounted in its operative position upon the threads 5 with the result that the faces of the body member 2 of the coil 1 exert a gripping action on the faces 6 of the threads 5. The nut 8 which is to cooperate with the bolt B has a circumferential groove or bore 9 formed in the lower face 10 thereof (see Figure 2). The said circumferential groove 9 is bounded by the cylindrical walls 11 and the floor 12. A slot 13 leads from a face 14 of the nut 8 to the circumferential groove 9. The slot 13 is formed so that its longitudinal axis forms an angle other than a right angle with the tangent to the circumference of the bolt B drawn at the meeting point of the said longitudinal axis and the said circumference. It is this particular structure of the slot which makes it impossible to use the braking coil in any but the proper position.

Figure 1:
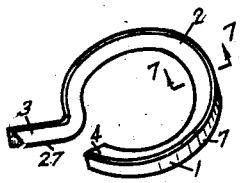
Figure 7:
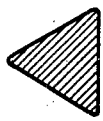
Figure 7 is a section taken along the line 7—7 of Figure 1.
Figure 8:
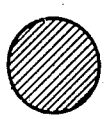
Figure 8 is a view taken similarly to Figure 7 but on a band of different cross-section than that shown in Figure 1.

The braking coil 1 may be triangular in cross-section (as shown in Figures 1 and 7), or it may be circular in cross-section (as shown in Figure 8), or any other cross-section desired.

Although the manner of use of my particular coil is believed to be obvious from the foregoing description, yet to obviate any misunderstanding, the following detailed description is here given.

Figure 2:
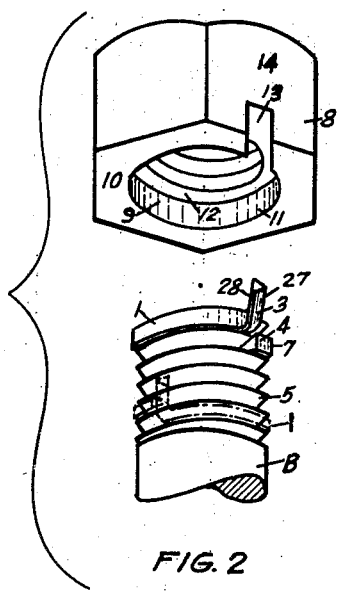

I start with the bolt B, a nut 8 and a coil 1 adapted to cooperate with the said bolt B. The coil 1 may be placed upon the bolt B to assume the position shown in Figure 2. The nut 8 is then placed over the bolt B (as shown in Figure 2) and lowered so that the lug 3 is received within the slot 13 while the body member 2 is received within the circumferential groove 9. The nut 8 may then be turned downwardly until the lower surface 10 contacts with the upper surface of the member M which is being bolted (see Figure 4). It is to be noted that the outer surface 7 of the body member 2 of the coil 1 is absolutely free of the walls 11 of the circumferential groove 9 (see Figure 4). It is further to be noted that although the slot 13 is wider than the lug 3, nevertheless, the lug 3 touches the walls of the said slot at two points, P and P', as is clearly shown in Figure 3. It is to be noted that when the braking coil 1 is in the proper position upon the bolt B, as shown by the full lines in Figure 2, the direction of the coil is clockwise when looking down upon the bolt from above and the lug 3 is taken as the starting point of the coil.

When the coil 1 is in this position the nut 8 may be freely rotated in a clockwise direction so as to advance the same upon the bolt B, but it cannot be freely turned in a counterclockwise direction so as to remove the nut from the bolt. For, rotation of the nut in a clockwise direction results in the contact of the wall 15 of the slot 13 with the lug 3 at the point P' and exerts a pressure which tends to open or enlarge the circumference of the body member 2 of the coil 1. However, should it be attempted to reverse the rotation of the nut 8 and move the same off the bolt, the wall 16 will contact with the lug 3 at the point P, exerting a pressure upon the said lug tending to decrease the circumference of the body member 2 of the coil 1 with the result that a braking action is obtained, thereby opposing the rotation of the nut 8 in a direction off the bolt B.

It is obvious that if the coil 1 is reversed and made to assume the position shown by the dot and dash lines in Figure 2, then the reactions between the lug 3 and the walls of the slot 13 when the nut is rotated are the opposite of those just set forth with the result that a braking action will be exerted by the coil when an attempt is made to advance the nut upon the bolt and an unlocking action will be exerted by the coil when it is attempted to move the nut off the bolt.

Figure 5:
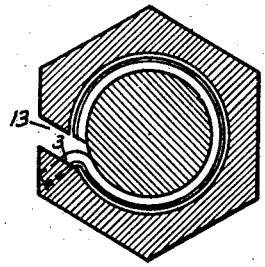
Figure 5 is a section taken similarly to Figure 3 wherein the brake band has been reversed that is rotated through a plane of 180°, and illustrates the nonreversible or fool-proof feature of my invention.
Figure 6:
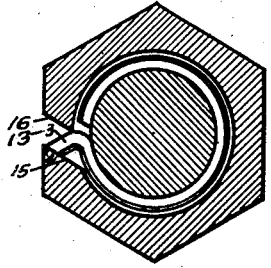
Figure 6 is a section taken similarly to Figure 3 showing the brake-band in the reversed position but rotated to assume a different position, relatively to the nut slot, than that shown in Figure 5.

However, with my particular structure it will be impossible to reverse the coil and yet have the lug 3 enter the slot 13. For, when the coil 1 is reversed and made to assume the position shown by the dot and dash lines in Figure 2, then the lug 3 falls beyond the slot 13 (as shown in Figure 5). Rotation of the coil 1 in its reversed position to the point where it is immediately under the slot 13 will not result in the lug 3 being so positioned as to be received in the slot 13 but, instead, will result in the position where the lug 3 lies across the slot 13 (as is clearly shown in Figure 6).

In Figure 9, I have illustrated a coil 1' which differs from the coil 1 only in the fact that the body member is somewhat greater than a single turn. The disclosure in Figure 9 differs from that shown in Figures 1 to 4 inclusive in the further fact that a square nut 18 is shown and that the slot 19 is on a different angle and narrower than the slot 13. However, the angle which the longitudinal axis of the slot 19 makes with a tangent to the circumference of the bolt B at the intersection of the said axis and circumference is some angle other than 90°.

In Figures 10 and 11 a braking coil 1' is shown mounted upon a bolt B in operative position within a slot 19' and a bore 9' formed with a nut 18'. The nut 18' differs from the nut 18 only in the fact that it is hexagonal. The slot 19' is exactly the same as the slot 19 in the nut 18. The width of the slots 19 and 19' is sufficient to snugly receive the lug 3' formed on the coil 1'. The bore 9' is exactly the equivalent of the bore 9. The locking lug 3' is exactly the equivalent of the lug 3. Improper mounting or reversal of the coil 1' upon the bolt B results in a position wherein the lug 3' cannot enter or be received within the slot 19' as is clearly shown in Figure 12.

Figure 4:
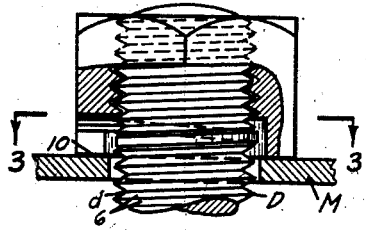
Figure 4 is a view showing the nut and brake band mounted in operative position upon the bolt, a portion of the nut being broken away for the purpose of clearness.

In the disclosure of Figures 9 to 11 inclusive face to face contact between the slot walls and the faces of the lug is substituted for the point contact disclosed in Figures 2 to 4 inclusive. Rotation of the nut 18 or 18' in a clockwise direction results in the face to face contact of the slot wall 25 or 25' with the faces 27 or 27' of lug 3 or 3' depending upon the nut and coil used. Similarly rotation of the nut 18 or 18' in a counterclockwise direction results in a face to face contact between the slot wall 26 or 26' with the face 28 or 28' of the lug 3 or 3' depending upon the nut and coil used.

Figure 13:
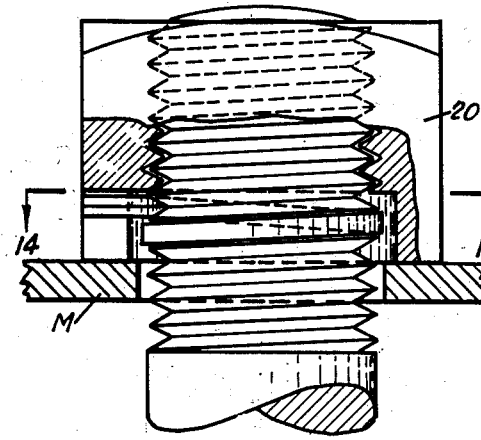
Figure 13 is a view of the assembly of a square nut and a brake lock in operative position upon a bolt. A portion of the nut has been broken away for the purpose of clearness.

Figures 13 and 14 disclose a square nut 20 having a straight slot 13' which is offset with respect to the center line c—c of the nut 20. It is to be noted that the longitudinal axis of the slot 13' forms an angle other than one of 90° with the tangent to the circumference of the bolt B drawn at the intersection of the said axis and circumference. Reversal of the coil 1 results in its assuming the position shown by the full and dotted lines in Figure 15. Rotation of the coil 1 in an attempt to cause the lug 3 to fall within the slot 13' only results in the lug 3 falling across the slot 13'. This is shown by the dot and dash lines in Figure 15.

Figures 16, 20, 21 and 22 illustrate a nut and slot of the type shown in Figures 9, 10 and 11 associated with a band 19 which encircles the outer peripheries D of the thread 5 instead of a helical coil which follows the threads and grips the faces 6 of the threads 5. The band 17 is composed of a body member 21 and terminates in a locking lug 22. It may be somewhat more than one turn, as shown in Figure 16, or it may be substantially one turn, as shown in Figures 20 and 21. In either case the principle of operation is generally similar to that outlined in connection with Figures 1 to 4 inclusive, with the exception that an entire wall 15' or 16' of the slot 13' bears against the lug 22 just the same as in Figures 9, 10 and 11. Reversal of the band 21 on the bolt B results in the fact that the lug 22 falls without the slot 13' and cannot be received within the same. (See Figure 22.)

In Figure 23, I illustrate a band 23 which differs from the band 17 in the fact that threads 24 are formed on the inner surface of the band 23. The threads are of the same pitch and diameter as the threads 5 formed on the bolt B with which the band 24 is adapted to cooperate.

In Figures 24 and 25, I have diagrammatically illustrated the principles underlying my invention, Figure 24 showing my invention incorporated in a hexagonal nut and Figure 25 showing my invention incorporated in a square nut. In Figure 24 there are shown two slots Q and R, the former being a slot at an angle to the face of the nut and situated approximately at the center point of the nut while the latter is a slot at right angles to the face of the nut and placed off center with respect to the line UW representing the center line of the said nut through the face from which the slot R extends. It is to be noted that in the slot Q the line AB which is the longitudinal axis of the slot Q forms the angles ABC and ABD with the tangent CD drawn to the circumference of the bolt B at the point of intersection of the said circumference of the bolt with the said longitudinal axis AB. The angles ABC and ABD are each other than 90°. Similarly, the longitudinal axis EF of the slot R forms the angles EFH and EFG with the tangent GH drawn to the circumference of the bolt at the point of intersection of the said circumference and the said longitudinal axis EF. The angles EFH and EFG are each other than 90°. The slot Q is typical of the structure illustrated in Figures 2, 3, 9, 10 and 11, while the slot R is representative of a structure in a hexagonal nut which would be the equivalent of the slot shown in Figures 13 and 14. In structures such as are illustrated by slots Q and R it is impossible for the coil to be received in its proper operative position within the nut unless the coil has been properly mounted upon the bolt.

If, however, instead of making the slot in such a manner that its longitudinal axis forms an angle other than a right angle with the tangent to the circumference of the bolt at the point of intersection of the circumference and the said longitudinal axis, we were to so form the slot that its longitudinal axis would form an angle of 90° with the tangent to the circumference drawn at the point of intersection of the circumference and its longitudinal axis, then it would be possible to mount the braking coil upon the bolt either in the proper or improper position and yet the coil would be received within the bore and the slot formed in the nut. There would be nothing in such cases to warn the user that the coil has not been properly mounted. Such a structure is illustrated by the slots S and T in Figure 24. The longitudinal axis IJ of the slot S is at right angles to the tangent KL and the longitudinal axis MN is at right angles to the tangent OP. In Figure 25 the slots Q' and R' are the equivalents of the slots Q and R of Figure 24 and the slots S' and T' are the equivalents of the slots S and T of Figure 24. It is to be noted that with my structure, which makes it impossible to place the coil upon the bolt in any but the proper position, it becomes unnecessary to issue instructions to the users of the locking device as to the proper method of assembling the same. The device checks itself automatically and improper mounting becomes immediately obvious to even the most unskilled person.

It is obvious that since the circumference of the bolt practically coincides with the outer periphery of the threads formed on the nut which cooperates with the bolt that a slot whose longitudinal axis forms an angle other than a right angle with the tangent to the circumference of the bolt drawn at the point of intersection of the said longitudinal axis and the said circumference would also form an angle other than a right angle with the circumference of a circle represented by the periphery of the threads formed on the nut.

I have discovered further that the placing of the slot in certain positions will result in a material increase in the downward or braking force which is exerted by the body member of the coil. This increased braking force is entirely due to the reactions between the slot walls and the lug of the coil and is in addition to any braking force which results in the body member of the coil. This discovery is illustrated in the force diagrams shown in Figures 26 to 29 inclusive.

In the disclosure of Figures 26 to 29 it has been assumed that a force F applied to the nut as shown results in a pressure upon the lug of the coil which in turn results in a reaction of 10# in the direction of the 10# vector shown. The 10# vector is parallel to the line determined by the points $x$ and $y$ which has been arrived at as follows:—It is assumed that the coil is a flexible band anchored at a point near its free end 4 or 4' (see Figures 1, 2 and 9). Any force applied to the nut in the direction F, shown in Figure 26, results in a pressure upon the lug 1 which tends to pull or make the coil taut. Because of the position of the coil the point $x$ becomes the primary pivot point around which the band is pulled and the point $y$ becomes the secondary pivot point. The force exerted against the coil is therefore along the line $xy$ and in a direction opposite to that shown by the vector 10# which represents the reaction.

Figure 26:
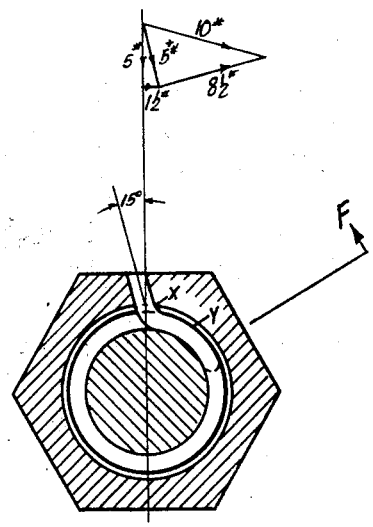
Figure 27:
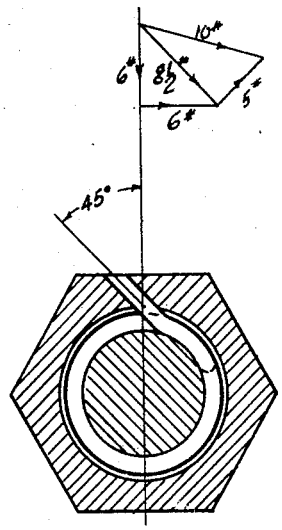
Figure 28:
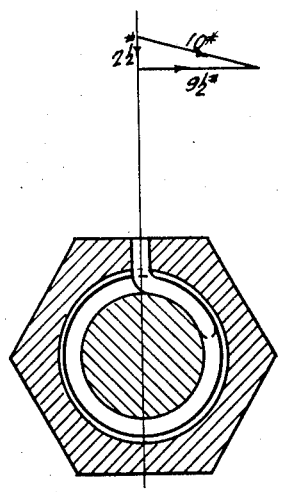
Figure 29:
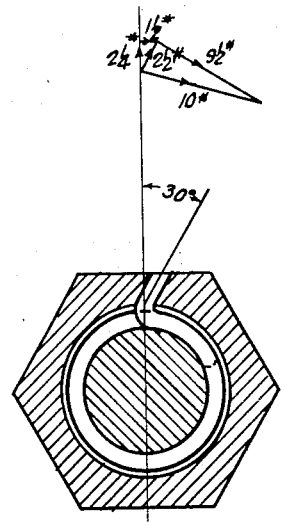

Referring to Figure 26 it is to be noted that when the longitudinal axis of the slot falls to the left of the center line passing through the point of intersection of the longitudinal axis of the slot with the outer circumference of the groove formed in the nut with which the coil cooperates, and forms an angle of 15° with the said center line, a force F applied in a direction tending to move the nut off the bolt will result in reactions such as illlustrated in the force diagram of Figure 26 wherein one of the resultants of the reactive force of 10 pounds is a component force of five pounds in a downward or, braking direction. This force increases as the angle is increased from 15° outwardly in a counterclockwise direction, as shown by Figure 27, and decreases when the angle is decreased in a clockwise direction, as shown in Figure 28. When the longitudinal axis of the slot is directly upon the center line, a modification which has not incorporated therein the self-checking feature of my invention, the force has decreased to 2½ pounds (see Figure 28). As rotation of the slot axis angle is continued in a clockwise direction, this downward force passes through the zero point to become a negative force or a force in an upward direction, as shown in Figure 29, which shows a slot having a longitudinal axis to the right of the center line passing through the point of intersection of the longitudinal axis of the slot and the circumference of the groove and forms an angle of 30° with the said center line.

For the purpose of brevity the angles which are made by the longitudinal axis of the slot will be termed as either positive or negative in accordance with the terms of the following definition.

*Positive angle.*—The term "positive angle" as used in the claims and specifications is used to denote any angle formed between the longitudinal axis of the nut slot and a center line drawn to the point of intersection of the said longitudinal axis and the outer circumference of the slot groove causing a braking action of the lug upon movement of the nut off the bolt.

*Negative angle.*—The term "negative angle" as used in the claims and specifications is used to denote an angle formed between the said longitudinal axis and the said center line, as more particularly set forth in the definition of the term "positive angle", wherein the reactive force which results in the lug because of the force applied to the nut tending to move the said nut off the bolt is in an outward or non-braking direction.

In the light of this discovery it becomes obvious that the greater the positive angle the greater will be the braking force applied by the coil. It is further obvious that if the angle is made great enough this force will become practically infinite. The choosing of the proper angle for any particular material will be dependent upon the force desired and the materials used and is a matter which can be easily determined by direct experimentation. It is to be remembered that the force resultant in all positive angle slot structures herein referred to is a braking force which results because of the angular structure of the slot with respect to a specific dead center line and is in addition to the braking pressure which otherwise exists in the coils.

For the purpose of definiteness, the following definitions are here given to the following terms:—"threads", "bore or groove", and "slot".

*Threads.*—The term "threads" as used in the claims and specifications is used to denote threads formed either on the male or female member of the threaded element and also the peripheries of the said threads.

*Bore or groove.*—The term "bore or groove" as used in the claims and specifications is used to denote a circumferential bore such as 9 which is formed in the female member of the threaded element.

*Slot.*—The term "slot" as used in the claims and specification is used to denote a slot such as 13 which leads outwardly from the bore or groove.

The above disclosure is to be understood as being by the way of illustration only and not by the way of limitation since many changes may be made in the device herein disclosed without departing from the spirit of my invention. For instance, the material of which either the nut, bolt or band is made may be changed: or instead of running the slot from the groove to the face of the nut it may be terminated short of the face of the nut and the length of the lug may be modified to suit: or instead of using a coil with substantially a single turn as illustrated by me and which I prefer, a coil having a plural number of turns or less than one turn may be used: or instead of placing the groove on the bottom or contacting surface of the nut which is the position preferred by me, it may be placed on the top or non-contacting surface of the nut. The above as well as other changes are all contemplated by me and for this reason it is my desire that the claims which are hereunto appended for the purpose of defining my invention should be limited only by the prior art.

Having described my invention, what I claim as new and useful is:—

1. As an article of manufacture a threaded element adapted to serve as the female member of two elements which are to be threadably joined together the said element having an annular groove formed therein and only a slot leading outwardly from the said groove, the longitudinal axis of the said slot forming an angle other than a right angle with the tangent to the threads of the said threaded element drawn at the point of intersection of the said axis with the said threads.

2. The combination with a female threaded element having an annular groove formed therein and only a slot extending outwardly from the said groove, the longitudinal axis of the said slot forming an angle other than a right angle with the tangent to the threads of the said threaded element drawn at the intersection of the said threads and the said longitudinal axis, of a band having an internal diameter substantially equal to the diameter of the said threads, having an external diameter smaller than that of the said groove and terminating at one end in a lug positioned for being received in the said slot.

3. The combination with a female threaded element having an annular groove formed therein and only a slot extending outwardly from the said groove, the longitudinal axis of the said slot forming an angle other than a right angle with the tangent to the threads of the said threaded element drawn at the intersection of the said threads and the said longitudinal axis, of a helical band having a pitch and internal diameter substantially equal to the diameter of the said threads, having an external diameter smaller than that of the said groove and terminating at one end in a lug positioned for being received in the said slot.

4. The combination with a female threaded element having an annular groove formed therein and only a slot extending outwardly from the said groove, the longitudinal axis of the said slot forming an angle other than a right angle with the tangent to the threads of the said threaded element drawn at the intersection of the said threads and the said longitudinal axis, of a flat band having an internal diameter substantially equal to the diameter of the said threads, having an external diameter smaller than that of the said groove and terminating at one end in a lug positioned for being received in the said slot.

5. The combination with a female threaded element having an annular groove formed therein and a slot extending outwardly from the said groove, the longitudinal axis of the said slot forming an angle other than a right angle with the tangent to the threads of the said threaded element drawn at the intersection of the said threads and the said longitudinal axis, of an internally threaded flat band the pitch and internal diameter of the said band threads being substantially equal to the pitch of the said female element threads, having an external diameter smaller than that of the said groove and terminating at one end in a lug positioned for being received in the said slot.

6. In combination a male and female element threadably joined together, the said female element having an annular groove formed therein and only a slot leading outwardly from the said groove, the longitudinal axis of the said slot forming an angle other than a right angle with the tangent to the threads on the said threaded elements drawn at the point of intersection of the said axis and the said threads, and a band mounted upon the said male member and positioned within the said groove, the said band having an internal diameter substantially equal to that of the said threads having a smaller external diameter than that of the said groove and terminating in a lug positioned within the said slot.

7. In combination a male and female element threadably joined together, the said female element having an annular groove formed therein and only a slot leading outwardly from the said groove, the longitudinal axis of the said slot forming an angle other than a right angle with the tangent to the threads on the said threaded elements drawn at the point of intersection of the said axis and the said threads, and a helical band mounted upon the said male member and positioned within the said groove, the said helical band having a pitch and diameter substantially equal to that of the threads on the said male member, having a smaller external diameter than that of the said groove and terminating in a lug positioned within the said slot.

8. In combination a male and female element threadably joined together, the said female element having an annular groove formed therein and only a slot leading outwardly from the said groove, the longitudinal axis of the said slot forming an angle other than a right angle with the tangent to the threads on the said threaded elements drawn at the point of intersection of the said axis and the said threads, and a flat band mounted upon the said male member and positioned within the said groove, the said band having an internal diameter substantially equal to that of the said threads, having a smaller external diameter than that of the said groove and terminating in a lug positioned within the said slot.

9. In combination a bolt, a nut mounted on the said bolt, the said nut having an annular groove formed therein on the lower face thereof and only a slot leading outwardly from the said groove the longitudinal axis of the said slot forming an angle other than a right angle with the tangent to the threads of the said nut and bolt drawn at the intersection of the said axis and the said threads on the said nut and bolt, and a band mounted upon the said bolt and positioned within the said groove, the said band having an internal diameter substantially equal to that of the said nut threads; having an external diameter smaller than that of the said groove, and terminating in a lug positioned within the said slot.

10. In combination a bolt, a nut mounted on the said bolt, the said nut having an annular groove formed therein on the lower face thereof and only a slot leading outwardly from the said groove the longitudinal axis of the said slot forming an angle other than a right angle with the tangent to the threads of the said threaded element drawn at the intersection of the said axis and the threads on said nut and bolt, and a flat band mounted upon the said bolt and positioned within the said groove, the said band having an internal diameter substantially equal to that of the said nut threads, having an external diameter smaller than that of the said groove, and terminating in a lug positioned within the said slot.

11. In combination a bolt, a nut mounted on the said bolt, the said nut having an annular groove formed therein on the lower face thereof and only a slot leading outwardly from the said groove the longitudinal axis of the said slot forming an angle other than a right angle with the tangent to the threads of the said threaded element drawn at the intersection of the said axis and the said threads, and a helical band composed substantially of a single turn mounted upon the said bolt within the said groove, the said helical band having a pitch and external diameter substantially equal to that of the said bolt threads, having a smaller external diameter than that of the said groove and terminating in a lug positioned snugly within the said slot.

12. In combination a bolt, a nut mounted on the said bolt, the said nut having an annular groove formed therein on the lower face thereof and a slot leading outwardly from the said groove the longitudinal axis of the said slot forming an angle other than a right angle with the tangent to the threads of the said threaded element drawn at the intersection of the said axis and the threads on said nut and bolt, and a flat internally threaded band mounted upon the said bolt and positioned within the said groove, the threads of the said internally threaded band having a pitch and internal diameter substantially equal to that of the said bolt threads, the said band having further a smaller external diameter than that of the said groove and terminating in a lug positioned within the said slot.

13. In combination a bolt, a male and female element threadably joined together, the said female male element having an annular groove formed therein and a slot leading outwardly from the said groove the longitudinal axis of the said slot forming an angle other than a right angle with the tangent to the threads of the said threaded elements drawn at the intersection of the said axis and the said threads, and a flat internally threaded band mounted upon the said bolt within the said groove, the threads of the said band having a pitch and internal diameter substantially equal to that of the said male member threads, having a smaller external diameter than that of the said groove and terminating in a lug positioned within the said slot.

14. In combination a male and female element threadably joined together, the said female element having an annular groove formed therein and only a slot leading outwardly from the said groove, the longitudinal axis of the said slot forming an angle other than a right angle with the tangent to the threads of the said threaded elements drawn at the point of intersection of the said axis with the said threads, the angle so formed being a positive angle as herein defined, and a helical band having substantially a single turn mounted upon the said male member and positioned within the said groove, the said band having an internal diameter substantially equal to that of the said male member threads, having a smaller external diameter than that of the said groove and terminating in a lug positioned within the said slot.

ALBERT HALL.